(12) United States Patent
Perkins et al.

(10) Patent No.: US 7,059,097 B2
(45) Date of Patent: Jun. 13, 2006

(54) APPARATUS FOR INFLATING AND SEALING AIR-FILLED PACKING CUSHIONS

(75) Inventors: Andrew Perkins, Berkeley, CA (US); Oliver M. Reyes, Berkeley, CA (US); Philipp Borchard, San Francisco, CA (US); Nicholas P. De Luca, Washington, DC (US)

(73) Assignee: Free-Flow Packaging International Inc., Redwood City, CA (US)

( * ) Notice: Subject to any disclaimer, the term of this patent is extended or adjusted under 35 U.S.C. 154(b) by 0 days.

(21) Appl. No.: 10/732,437

(22) Filed: Dec. 9, 2003

(65) Prior Publication Data

US 2004/0134164 A1 Jul. 15, 2004

Related U.S. Application Data

(60) Continuation of application No. 09/638,843, filed on Aug. 14, 2000, now Pat. No. 6,659,150, which is a continuation-in-part of application No. 09/439,552, filed on Nov. 12, 1999, now Pat. No. 6,209,286, which is a division of application No. 10/366,812, filed on Feb. 13, 2003, which is a division of application No. 10/108,823, filed on Mar. 26, 2002, now Pat. No. 6,605,169.

(60) Provisional application No. 60/123,497, filed on Mar. 9, 1992.

(51) Int. Cl.
*B65B 31/06* (2006.01)

(52) U.S. Cl. .............................. 53/79; 53/403; 53/512; 53/558; 53/568

(58) Field of Classification Search .................. 53/79, 53/94, 403, 512, 558, 562, 563, 568
See application file for complete search history.

(56) References Cited

U.S. PATENT DOCUMENTS

| | | | |
|---|---|---|---|
| 2,904,100 A | 9/1959 | Fener | |
| 3,253,122 A | 5/1966 | Kochmer et al. | |
| 3,359,703 A | * 12/1967 | Quaadgras | .................. 53/493 |
| 3,389,534 A | 6/1968 | Pendleton | |
| 3,492,783 A | 2/1970 | Dohmeier | |
| 3,554,135 A | 1/1971 | Duvall et al. | |
| 3,575,757 A | 4/1971 | Smith | |
| 3,660,189 A | 5/1972 | Troy | |
| 3,667,593 A | 6/1972 | Pendleton | |
| 3,674,614 A | 7/1972 | Templeton | |
| 3,703,430 A | 11/1972 | Rich | |
| 3,769,145 A | 10/1973 | Gresham et al. | |
| 3,817,803 A | 6/1974 | Horskey | |
| 3,868,285 A | 2/1975 | Troy | |
| 3,938,298 A | 2/1976 | Luhman et al. | |
| 4,017,351 A | 4/1977 | Larson et al. | |
| 4,021,283 A | 5/1977 | Weikert | |
| 4,096,306 A | 6/1978 | Larson | |
| 4,169,002 A | 9/1979 | Larson | |
| 4,415,398 A | 11/1983 | Ottayiano | |
| 4,465,188 A | 8/1984 | Soroka et al. | |
| 4,551,379 A | 11/1985 | Kerr | |
| 4,564,407 A | * 1/1986 | Tsuruta | ........................ 156/147 |
| 4,586,319 A | 5/1986 | Ausnit | |
| 4,596,111 A | 6/1986 | Ambrose | |
| 4,680,073 A | 7/1987 | Brunner et al. | |
| 4,793,123 A | 12/1988 | Pharo | |
| 4,847,126 A | 7/1989 | Yamashiro et al. | |
| 4,850,912 A | 7/1989 | Koyanagi | |
| 4,872,558 A | 10/1989 | Pharo | |
| 4,874,093 A | 10/1989 | Pharo | |
| 4,918,904 A | 4/1990 | Pharo | |
| 4,941,754 A | 7/1990 | Murdock | |
| 4,949,530 A | 8/1990 | Pharo | |
| 4,981,006 A | 1/1991 | Caenazzo et al. | |
| 5,009,318 A | 4/1991 | Lepinoy | |
| 5,046,258 A | 9/1991 | Cahill et al. | |
| 5,203,761 A | 4/1993 | Reichental et al. | |
| 5,216,868 A | 6/1993 | Cooper et al. | |
| 5,340,632 A | 8/1994 | Chappuis | |
| 5,402,892 A | 4/1995 | Jaszai | |

(Continued)

FOREIGN PATENT DOCUMENTS

| | | |
|---|---|---|
| DE | 297 17 551 U1 | 3/1998 |
| DE | 199 13 408 C2 | 10/2000 |
| DE | 199 13 408 A1 | 10/2000 |
| EP | 0836926 A2 | 4/1998 |
| FR | 2389547 | 12/1978 |
| FR | 2580597 | 10/1986 |
| FR | 2218401 A | 11/1989 |
| JP | 7/16961 | 1/1995 |
| JP | 7/165267 | 6/1995 |
| WO | WO 94/07678 | 4/1994 |
| WO | WO 98/40276 | 9/1998 |
| WO | WO 00/43198 | 7/2000 |
| WO | WO 00/43270 | 7/2000 |
| WO | WO 00/53501 | 9/2000 |
| WO | WO00 64672 | 11/2000 |
| WO | WO 01/85434 A2 | 11/2001 |

OTHER PUBLICATIONS

Claims from 10/031,111 (PCT/NL01/00351).
Fuss and Yampolsky declaration, 09/488,622.
Air–Fil 1200 photographs (no date but prior to applications's filing date).

(Continued)

*Primary Examiner*—Stephen E. Gerrity
*Assistant Examiner*—Thanh Truong
(74) *Attorney, Agent, or Firm*—Banner & Witcoff, Ltd.

(57) ABSTRACT

A machine which inflates and seals pillows in packaging is compact in overall size, can be conveniently operated to produce varied lengths of strips of inflated pillow-type packaging as needed, can begin production of inflated pillow-type strip packaging immediately after being held out of a production cycle for some period of time, and applies a heated sealing element directly to and in sliding contact with a web of film to securely seal the inlet port of an inflated pillow while the pillow is under pressure and as the web of film is continuously and uninterruptedly advanced through the machine.

30 Claims, 14 Drawing Sheets

U.S. PATENT DOCUMENTS

| | | | |
|---|---|---|---|
| 5,406,770 | A | 4/1995 | Fikacek |
| 5,427,830 | A | 6/1995 | Pharo |
| 5,447,235 | A | 9/1995 | Pharo |
| 5,454,642 | A | 10/1995 | De Luca |
| 5,535,888 | A | 7/1996 | De Luca |
| 5,552,003 | A | 9/1996 | Hoover et al. |
| 5,581,983 | A | 12/1996 | Murakami |
| 5,604,016 | A | 2/1997 | Allegre |
| 5,651,237 | A | 7/1997 | De Luca |
| 5,658,632 | A | 8/1997 | Krabill |
| 5,660,662 | A * | 8/1997 | Testone ..................... 156/145 |
| 5,692,833 | A | 12/1997 | De Luca |
| 5,693,163 | A | 12/1997 | Hoover et al. |
| 5,755,082 | A | 5/1998 | Takahashi et al. |
| 5,755,328 | A | 5/1998 | De Luca |
| 5,824,392 | A | 10/1998 | Gotoh et al. |
| 5,858,153 | A | 1/1999 | Mack |
| 5,873,215 | A | 2/1999 | Aquarius et al. |
| 5,937,614 | A | 8/1999 | Watkins et al. |
| 5,942,076 | A | 8/1999 | Salerno et al. |
| RE36,501 | E | 1/2000 | Hoover et al. |
| 6,015,047 | A | 1/2000 | Greenland |
| 6,209,286 | B1 | 4/2001 | Perkins et al. |
| 6,272,815 | B1 | 8/2001 | Todd et al. |
| 6,375,785 | B1 | 4/2002 | Aquarius |
| 6,410,119 | B1 | 6/2002 | De Luca et al. |
| 6,423,166 | B1 | 7/2002 | Simhaee |
| 6,460,313 | B1 * | 10/2002 | Cooper .......................... 53/79 |
| 6,582,800 | B1 | 6/2003 | Fuss et al. |
| 6,659,150 | B1 * | 12/2003 | Perkins et al. .............. 156/378 |
| 6,786,022 | B1 | 9/2004 | Fuss et al. |
| 2003/0118778 | A1 * | 6/2003 | Perkins et al. |
| 2004/0206050 | A1 | 10/2004 | Fuss et al. |

OTHER PUBLICATIONS

Figure exhibits identified as FPAC 016486 to FPAC 016490 (5 pages), dated Aug. 1999.

FPI v. CPS in Summary Proceedings, Judgement of Appeal Court dated Sep. 4, 2003.

FPI v. CPS, Case on the Merits. CPS Relay Statement in Claim Proceedings and Counterclaim Statement filed Feb. 12, 2003.

FPI v. CPS, Case on the Merits. CPS Joinder Statement; Reply Statement and Counterclaim Statement filed May 21, 2003.

FPI v. CPS, Case on the Merits. CPS Brief Concerning Augmentation of Counterclaim filed Oct. 8, 2003.

FPI v. CPS, Case on the Merits. CPS Statement of Rejoinder; Statement of Reply filed Jun. 2, 2004.

CPS v. FPI B.V. and FPI; CPS Writ of Summons filed Feb. 2005.

Free Flow Packaging International, Inc. v. Pactiv Corporation and Pactiv International Holdings Inc., Civil Action NO. 03-1157—Defendants' Opening Brief in Support Of Their Motion For Summary Judgement That The '150 Patent Is Unenforceable Due To Inequitable Conduct (Mar. 4, 2005).

Free Flow Packaging International, Inc. v. Pactiv Corporation and Pactiv International Holdings Inc., Civil Action No. 03-1157—Free-Flow's (1) Brief In Operation To Pactiv's Motion For Leave To File An Amended Answer, (2) In Opposition To Motion For Reconsideration Re Extending Discovery And Transfer, And (3) In Support Of Motion For Leave To File Motion For Partial Summary Adjudication If Leave To Amend Is Granted (Mar. 11, 2005).

Free Flow Packaging International, Inc. v. Pactiv Corporation and Pactiv International Holdings Inc., Civil Action No. 03-1157—FP'S Certified Counter–Statement Of Material Disputed Facts In Opposition To Pactiv's Motion For Summary Judgment To Invalidate The '150 Patent For Best Mode Violation (Mar. 18, 2005).

Free Flow Packaging International, Inc. v. Pactiv Corporation and Pactiv International Holdings Inc., Civil Action No. 03-1157—FP's Certified Counter–Statement Of Material Disputed Facts In Opposition To Pactiv's Opening Brief In Support Of Its Motion For Summary Judgment that The '150 Patent Is Unenforceable Due To Inequiable Conduct (Mar. 18, 2005).

Free Flow Packaging International, Inc. v. Pactiv Corporation and Pactiv International Holdings Inc., Case No. 1:05-cv-279-MHW—Documents Subject To Protective Order Entered On Jul. 28, 2004, 1. Pactiv's Motion For Leave To File A Second Amended Answer, Exhibit A: Second Amended Answer To First Amended Complaint, and Exhibit B: Copy Noting The Proposed Changes To Second Amended Answer To First Amended Complaint; and 2. Pactiv's Memorandum In Support of Its Motion For Leave To File A Second Amended Answer.

Free Flow Packaging International, Inc. v. Storopack, Inc. and Ideepak B.V., Civil Action No. 1:04-268—Defendant Storopack's Amended Answer to Free Flow Packaging International, Inc.'s First Amended Complaint for Patent Infringement, and Counterclaim for Declaratory Judgment with Jury Demand Endorsed Hereon.

Free Flow Packaging International, Inc. v. Storopack, Inc. and Ideepak B.V., Civil Action No. 1:04-268—Defendant Ideepak's Amended Answer to Free-Flow Packaging International, Inc.'s Complaint for Patent Infringement, and Counterclaim for Declaratory Judgment with Jury Demand Endorsed Hereon.

Free Flow Packaging International, Inc. v. Pactiv Corporation and Pactiv International Holdings Inc., Civil Action No. 03-1157—Deposition of Andrew Perkins, Dec. 2, 2004.

Free Flow Packaging International, Inc. v. Pactiv Corporation and Pactiv International Holdings Inc., Civil Action No. 03-1157—Exhibits from Deposition of Andrew Perkins, Dec. 2, 2004.

Free Flow Packaging International, Inc. v. Pactiv Corporation and Pactiv International Holdings Inc., Civil Action No. 03-1157—Deposition of Andrew Perkins, Jun. 14, 2005.

Exhibit showing AutoCAD drawings and file creation date on Nov. 22, 1999.

Free Flow Packaging International, Inc. v. Pactiv Corporation and Pactiv International Holdings Inc., Civil Action No. 03-1157—Deposition of Philippe Borchard, Jun. 15, 2005.

Free Flow Packaging International, Inc. v. Pactiv Corporation and Pactiv International Holdings Inc., Civil Action No. 03-1157—Deposition of Oliver Reyes, Jun. 21, 2005.

* cited by examiner

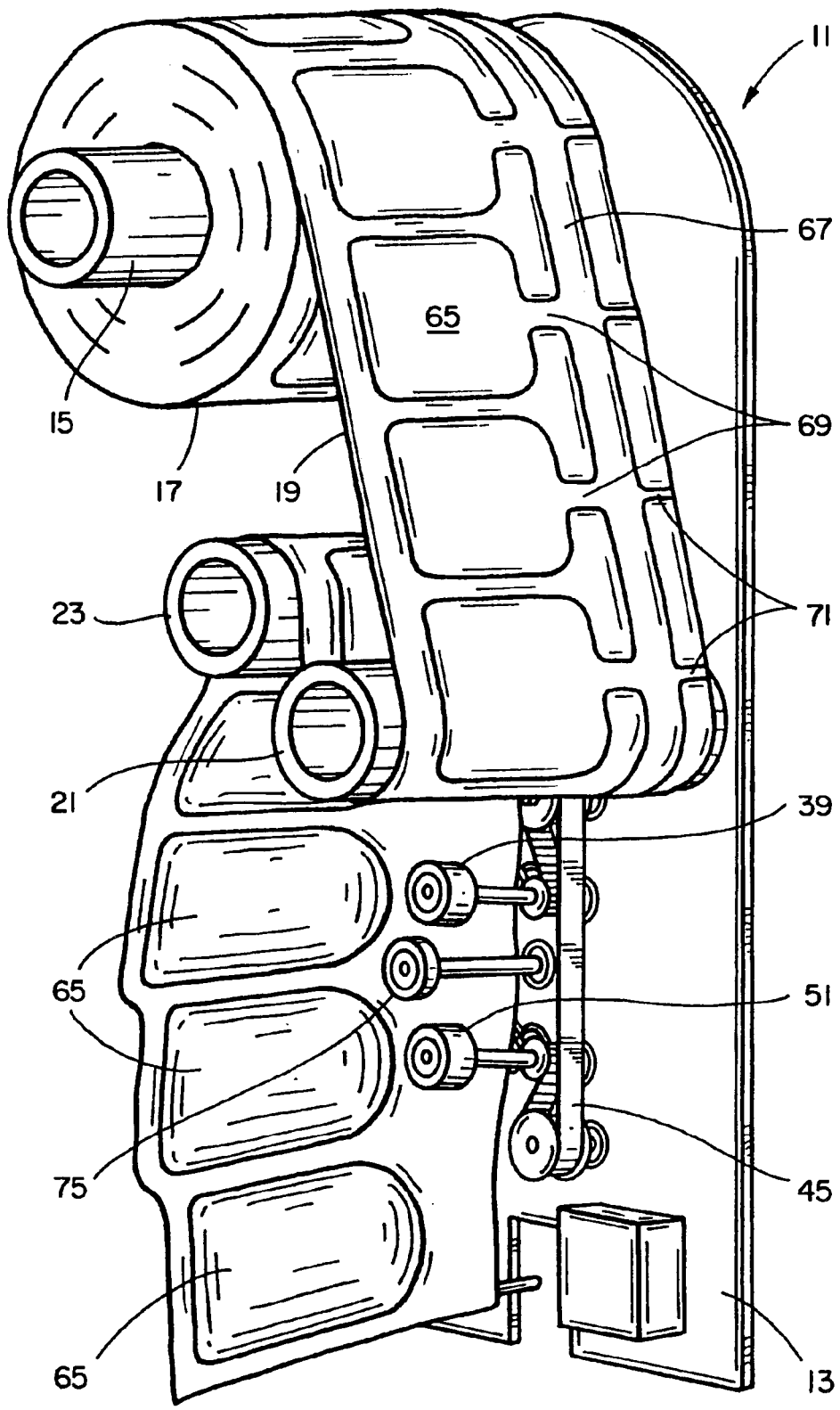
FIG_1

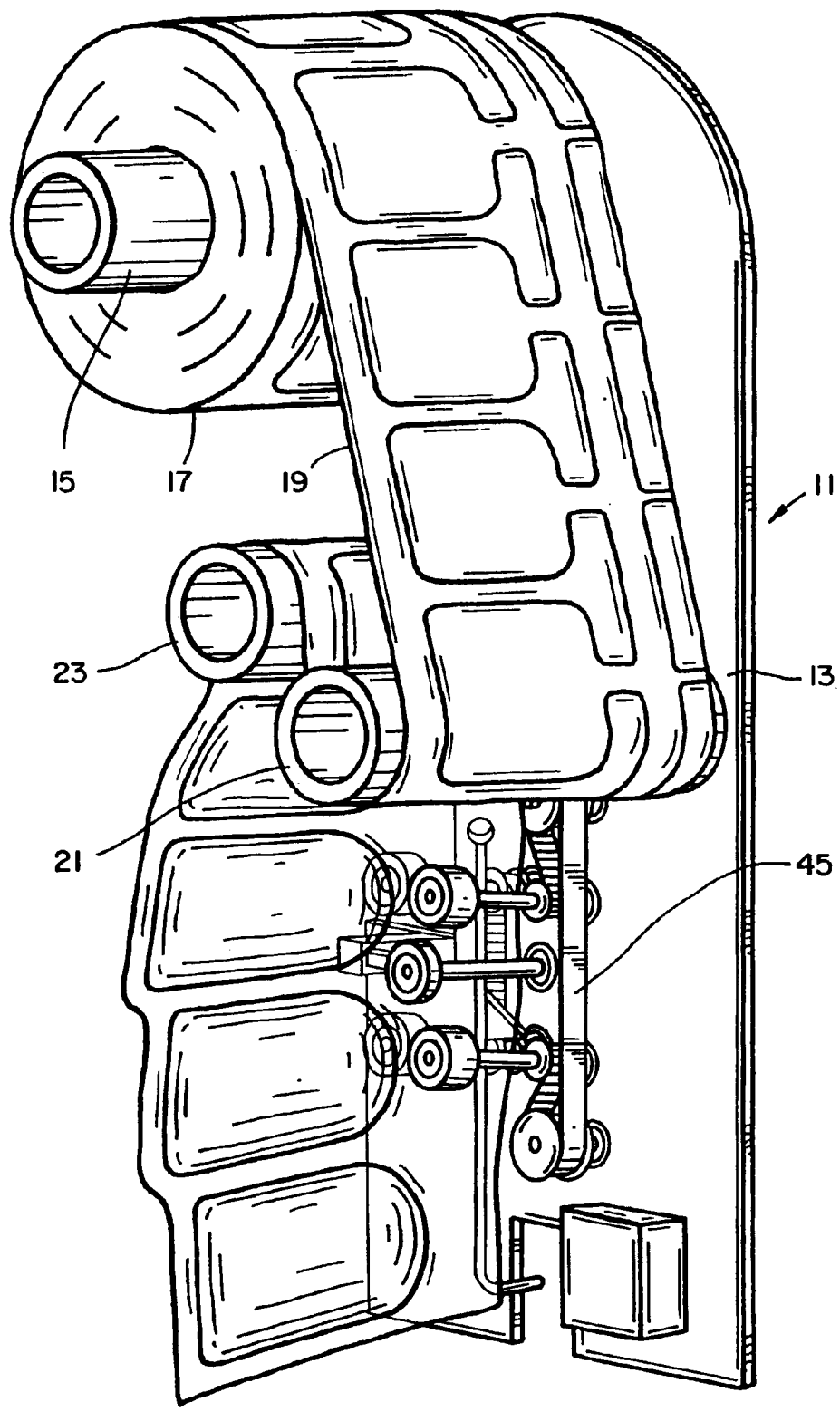
FIG_2

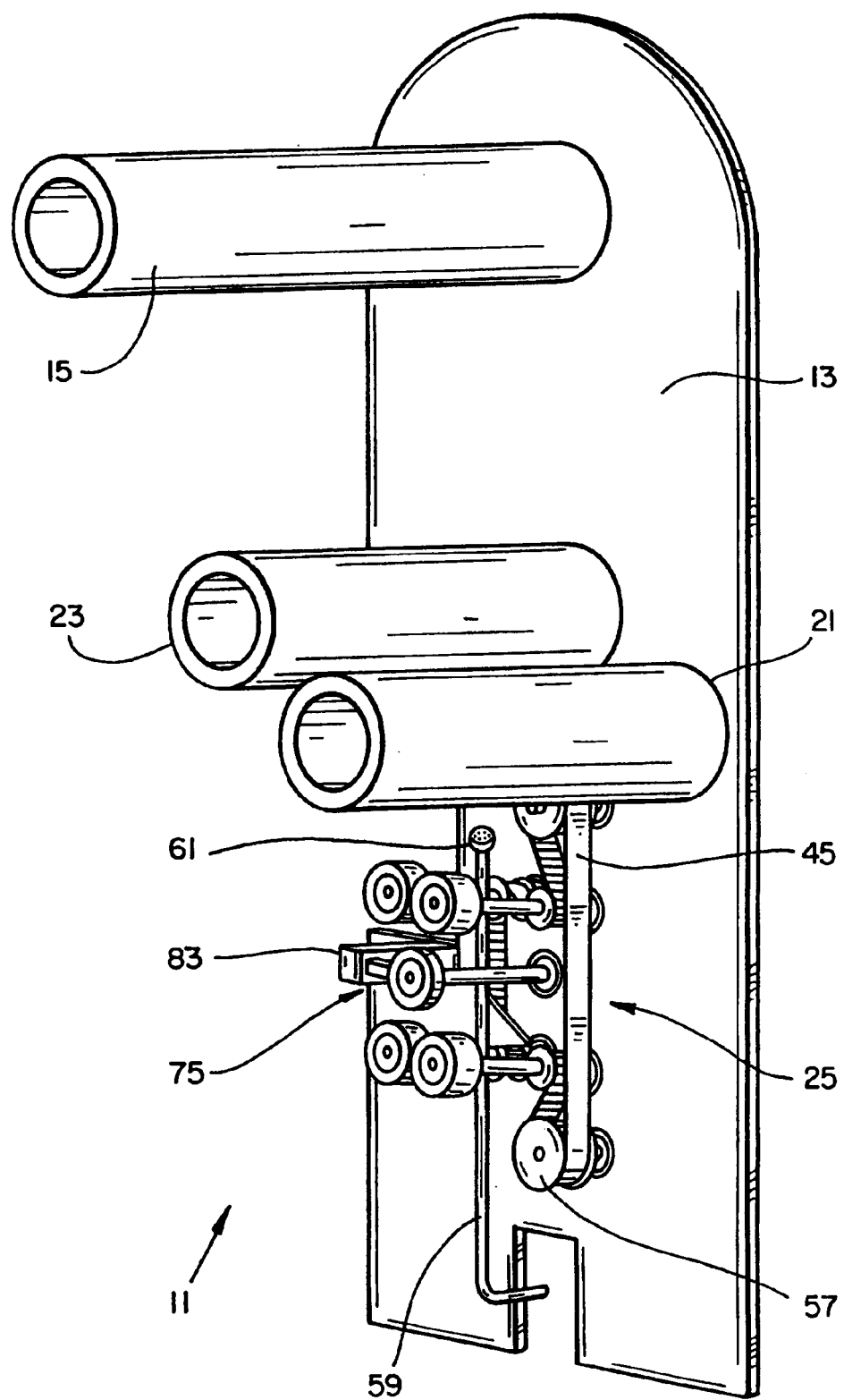
FIG_3

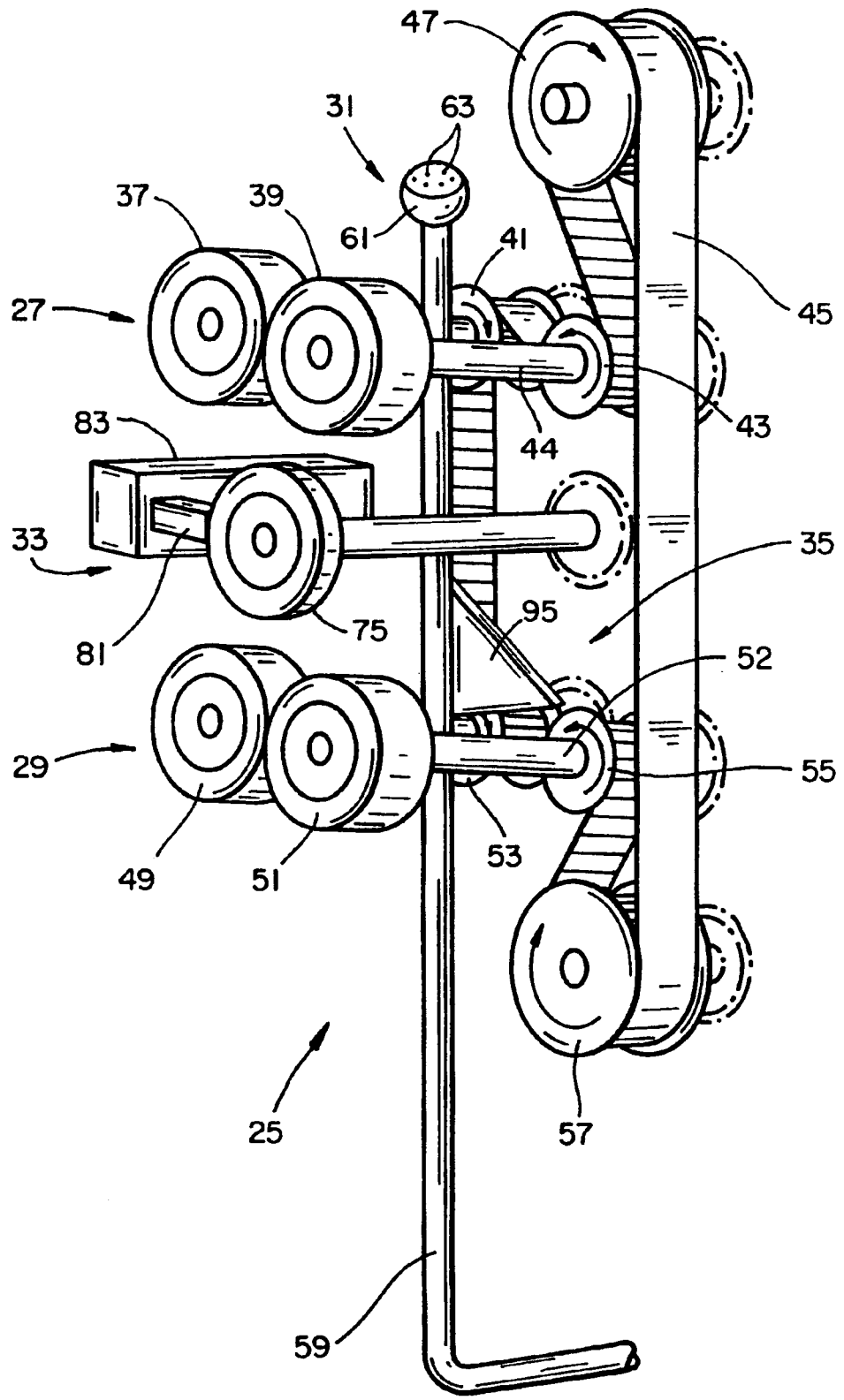
FIG_4

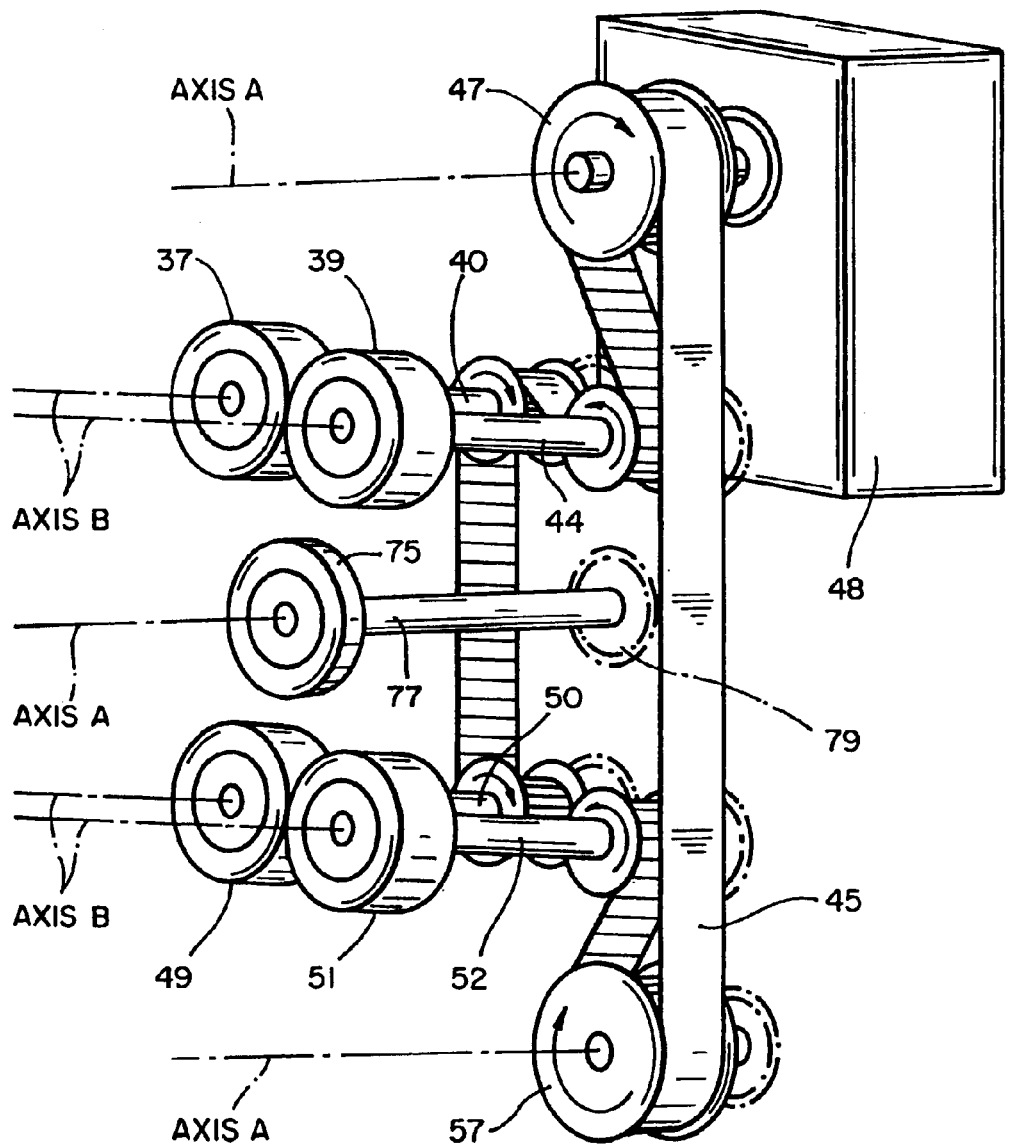

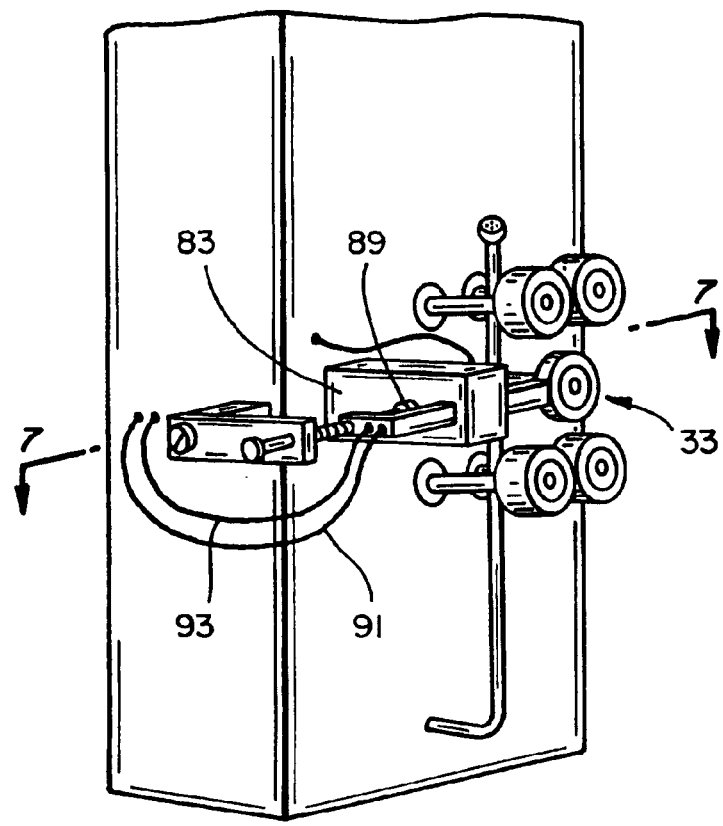
FIG_6
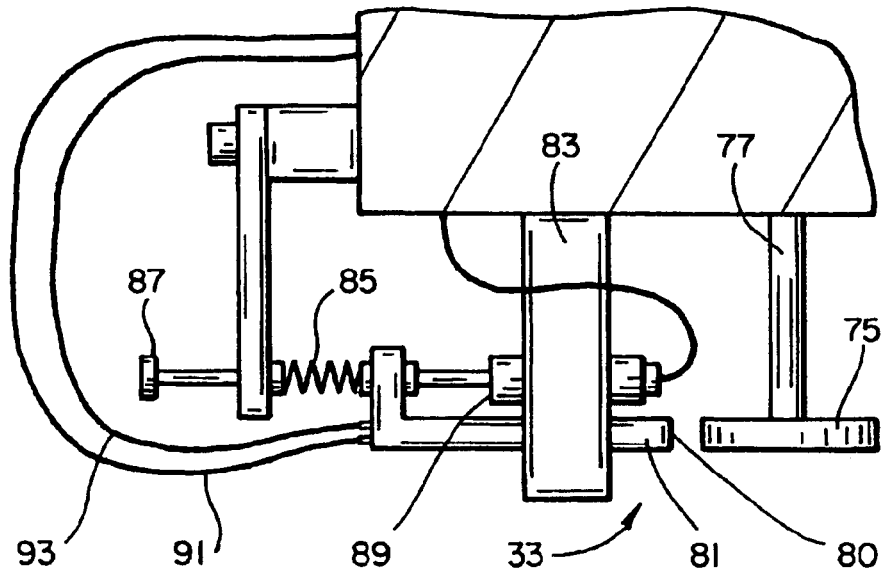
FIG_7

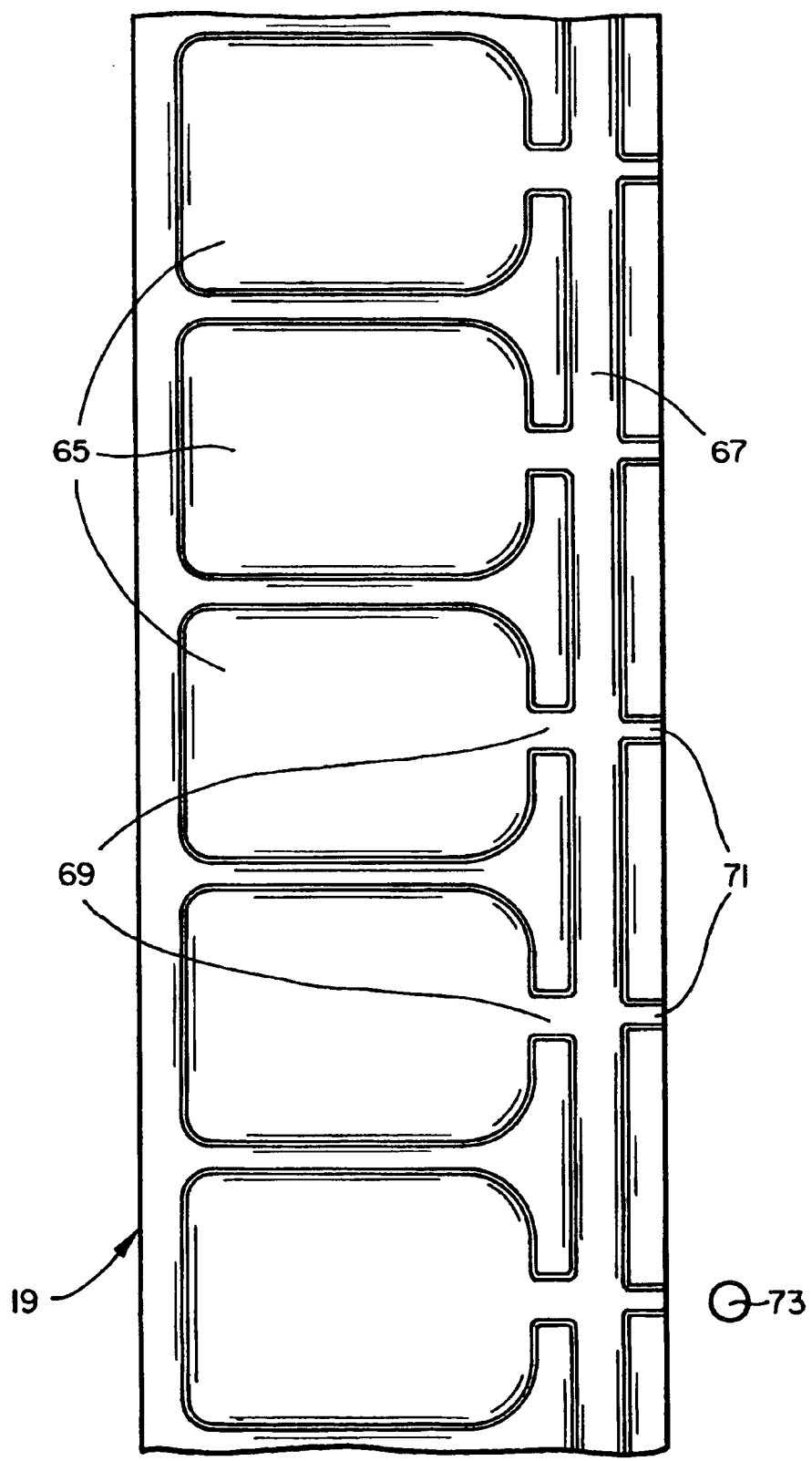
FIG_8

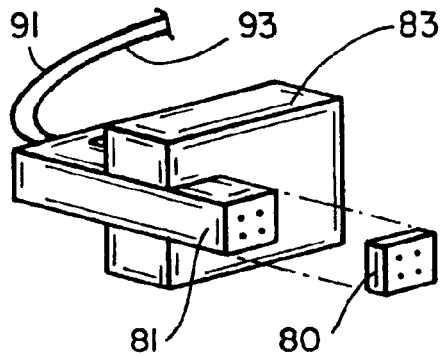
*FIG_9A*
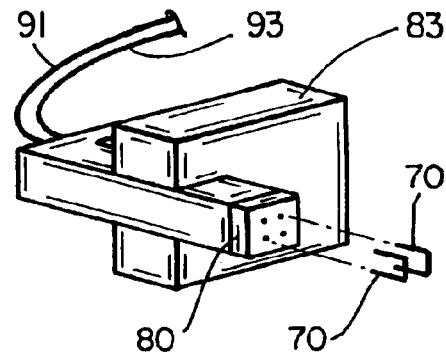
*FIG_9B*
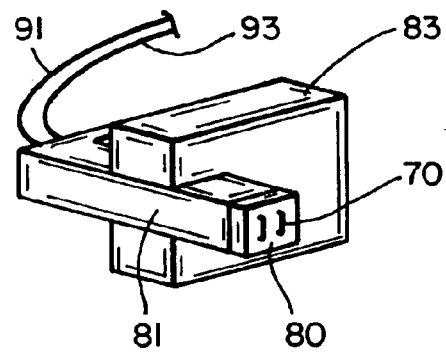
*FIG_9C*
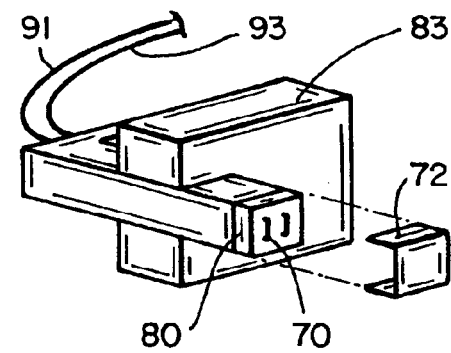
*FIG_9D*
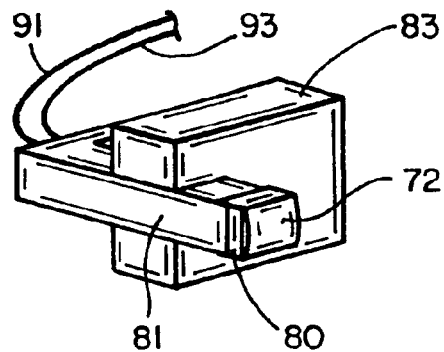
*FIG_9E*

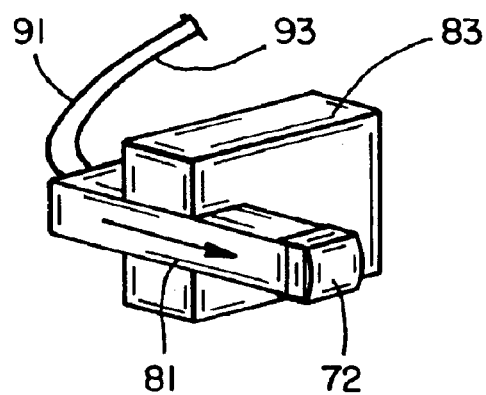
FIG_9F
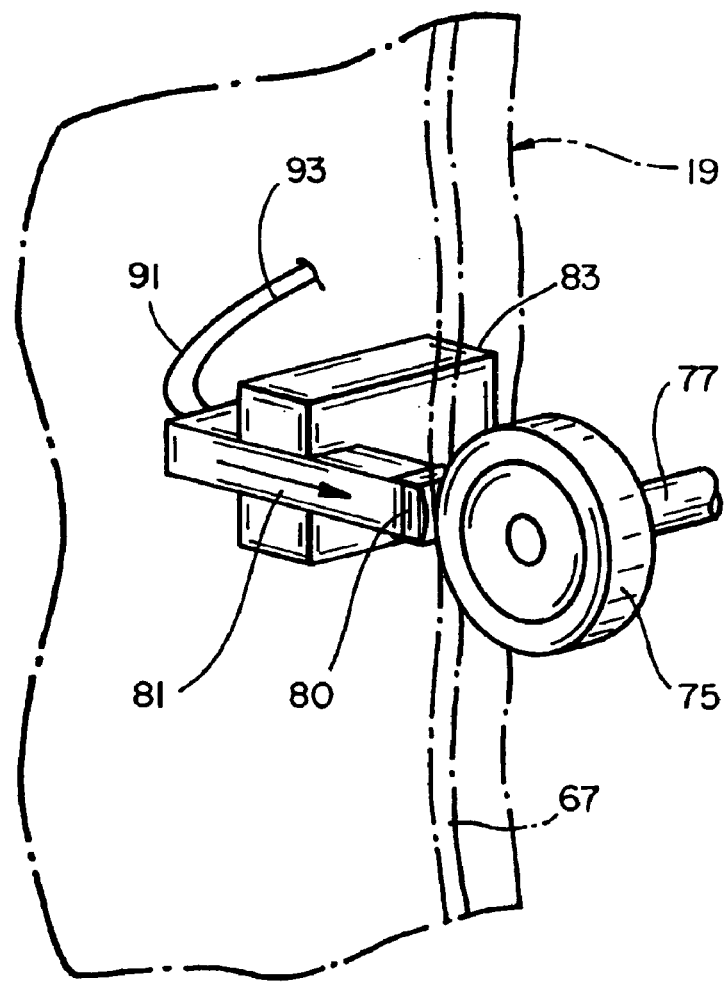
FIG_9G

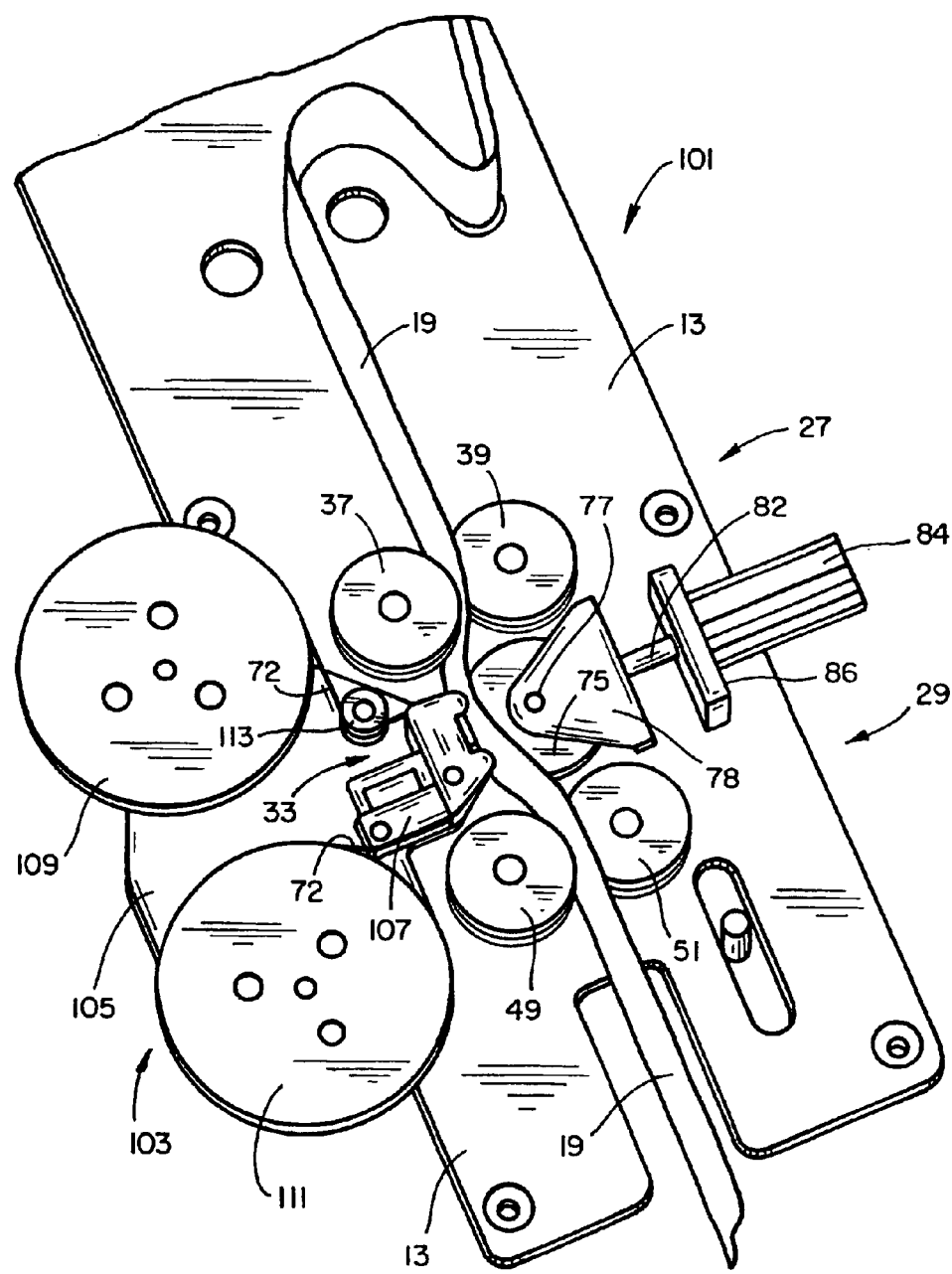
FIG_10

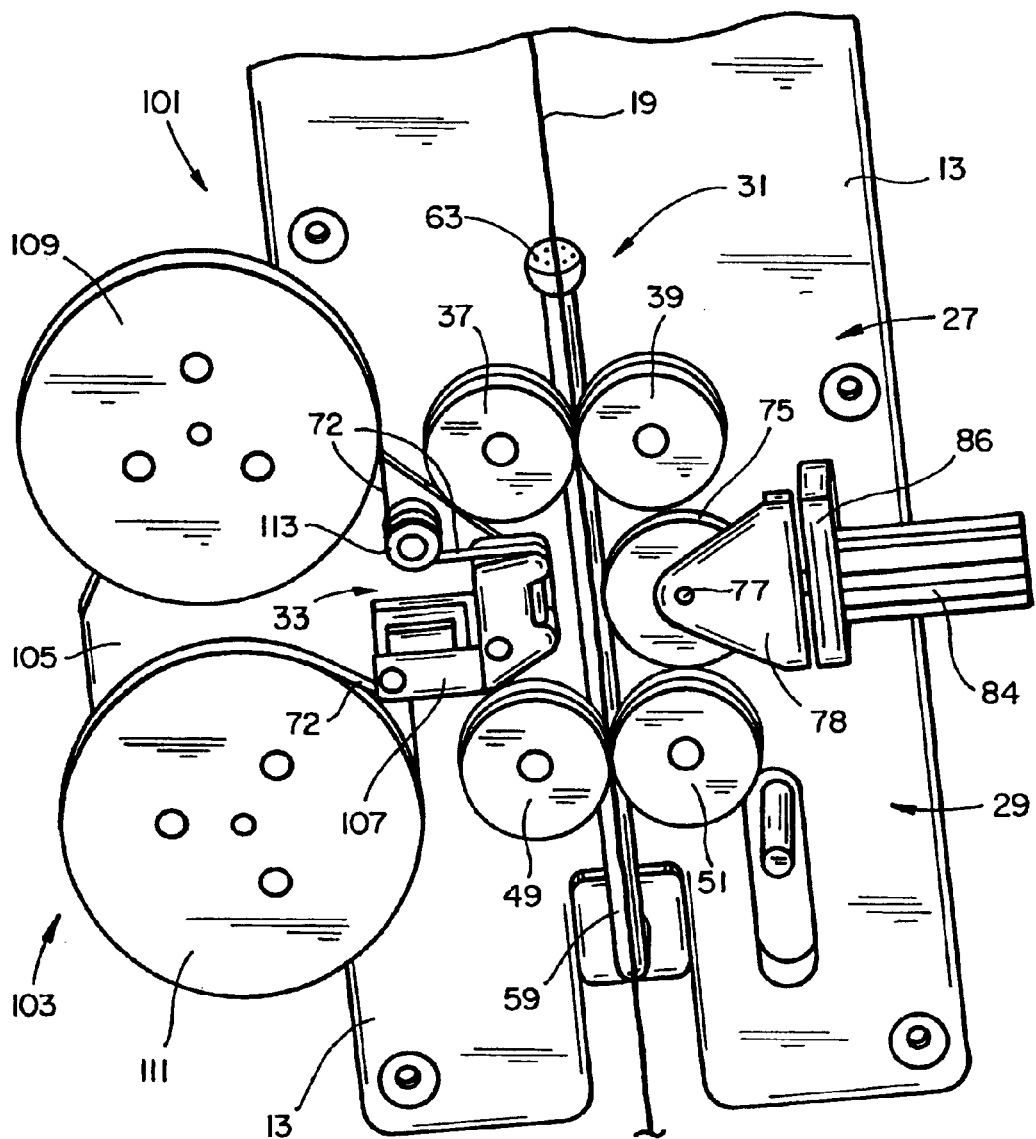
FIG_11

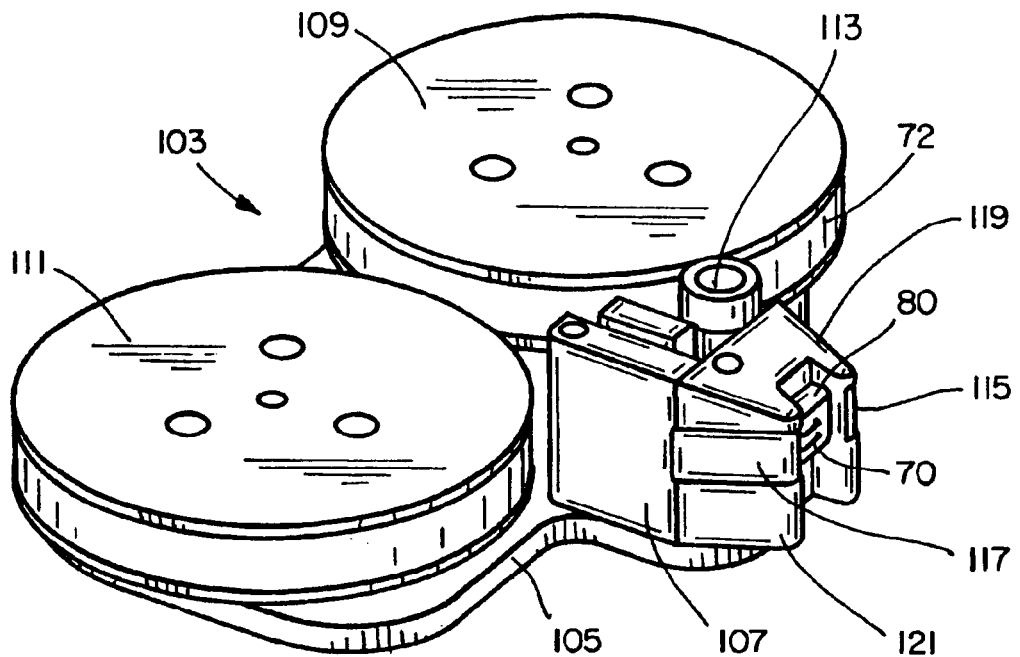
FIG_12
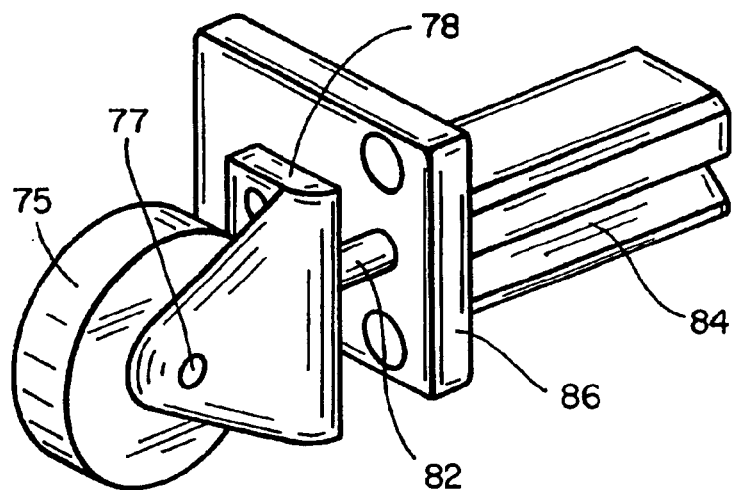
FIG_13

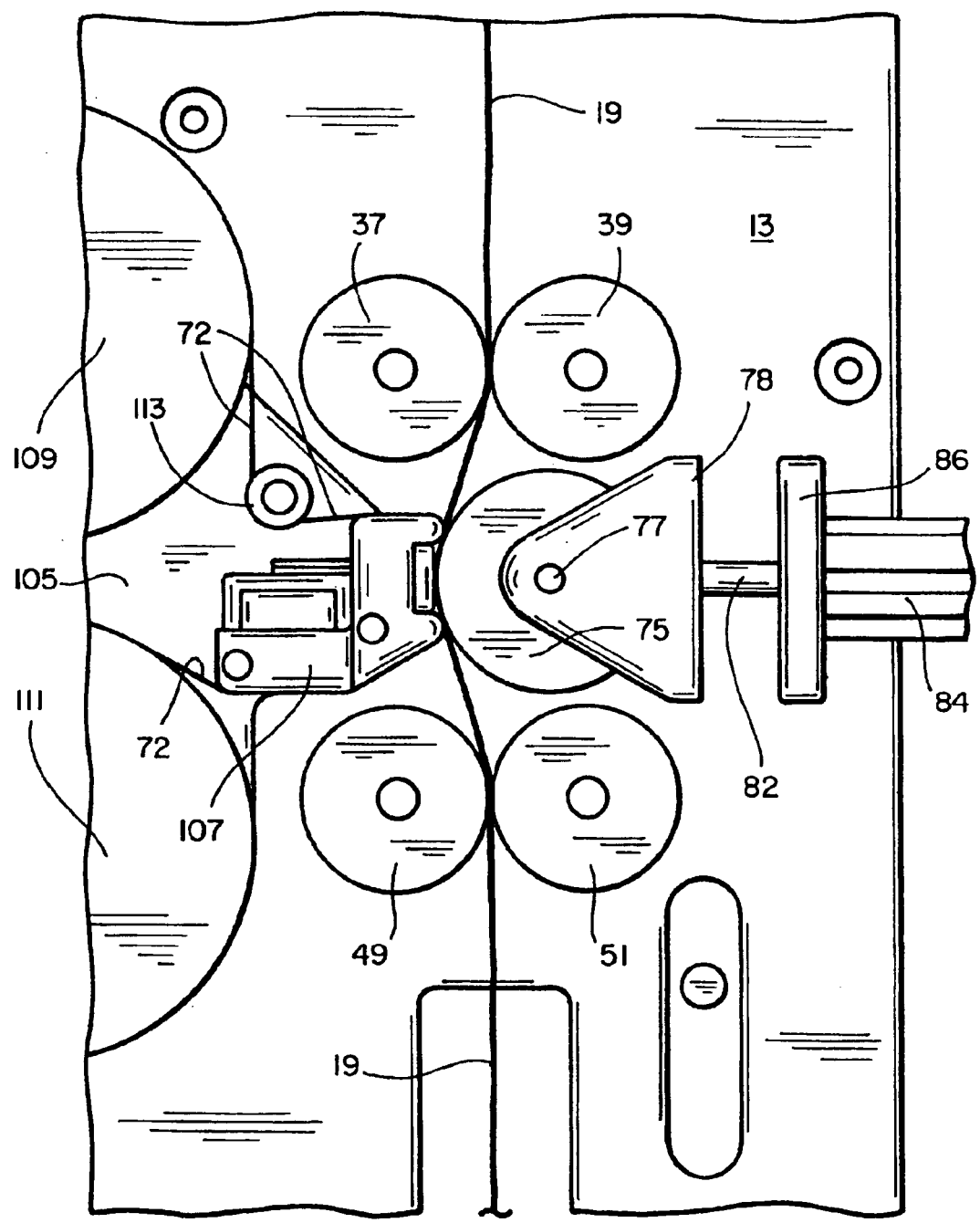
FIG_14

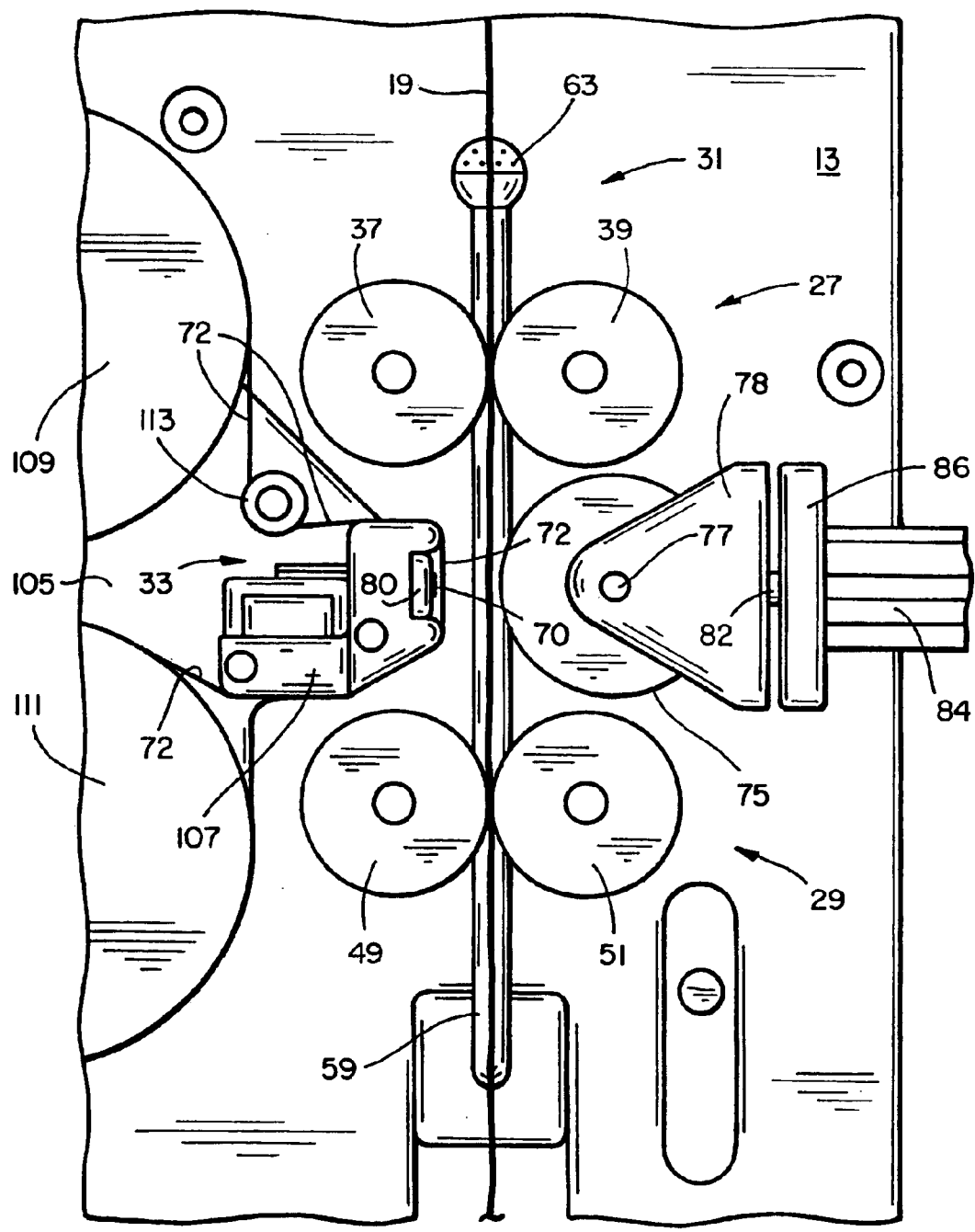
FIG_15

APPARATUS FOR INFLATING AND SEALING AIR-FILLED PACKING CUSHIONS

This is a continuation of Ser. No. 09/638,843, filed Aug. 14, 2000, U.S. Pat. No. 6,659,150, which is a continuation-in-part of application No. 09/439,552, filed Nov. 12, 1999, now U.S. Pat. No. 6,209,286, which in turn claims priority under 35 U.S.C. § 119(e) to Provisional Application No. 60/123,497, filed Mar. 9, 1999. This application also is a division of Ser. No. 10/366,812, Filed Feb. 13, 2003, which is a division of Ser. No. 10/108,823, filed Mar. 26, 2002, now U.S. Pat. No. 6,605,169.

BACKGROUND OF THE INVENTION

This invention relates to methods and apparatus for inflating and sealing pillows in packaging.

This invention relates particularly to the construction and operation of a machine which is small enough to be installed for operation on site where articles packaged for transport are placed in shipping containers with protective inflated pillow-type strip packaging.

This invention relates particularly to a machine which is compact in overall size, which can be conveniently operated to produce varied lengths of strips of inflated pillow-type packaging as needed, which can begin production of inflated pillow-type strip packaging immediately after being held out of a production cycle for some period of time and which applies a heated sealing element directly to and in sliding contact with a web of film to securely seal the inlet port of an inflated pillow while the pillow is under pressure and as the web of film is continuously and uninterruptedly advanced through the machine.

This invention relates particularly to a machine which forms the seal complete and secure during a short path of travel and during a short interval of time. The seal is made without the need for additional pressing together of the film after the sealing and without the need for additional cooling of the seal after the sealed inlet port moves out of contact with the sealing structure.

Webs of plastic film which are constructed to permit the production of strips of air filled envelopes, cushions and pillows have (in the past ten years or so) been used extensively for cushioning objects to be transported in containers.

The thin webs of plastic film are inexpensive, tough, resilient and recyclable. Strips of inflated pillow packaging which are created from these webs of plastic film are used for void-fill packaging to replace products such as crumpled paper or polystyrene peanuts and for protective packaging to replace molded or extruded foams.

U.S. Pat. No. 5,454,642; U.S. Pat. No. 5,651,237; U.S. Pat. No. 5,755,328; U.S. Pat. No. 4,017,351; and U.S. Pat. No. 5,824,392 disclose methods, apparatus, and webs of plastic film used for making strips of inflated pillow packaging of this general kind. Each of these U.S. patents is incorporated by reference in this application.

U.S. Pat. Nos. 6,116,600 and 6,209,286 also disclose methods, apparatus and webs of plastic film of this general kind and are incorporated herein by reference.

Sealing an inflated pillow made a web of plastic film while the air inflates the pillow under pressure and while the web of plastic film is being transported through the machine presents problems.

The seal must be secure and must not leak in order for the inflated pillow packaging to be used effectively for cushioning objects transported within a container.

The seal needs to be formed efficiently, quickly and without extensive, related pressing and/or cooling structure in order to make the machine as compact as possible in size and as efficient as possible in production rate.

To simplify machine construction and to provide a high efficiency of production, it is desirable to be able to make the seal as the web of plastic film is moved continuously and without any interruption and/or intermittent stopping of the film transport during the sealing operation.

It is a primary object of the present invention to construct and to operate a machine which is compact in size, which is efficient in production, which is continuous and uninterrupted in operation and which produces seals which are secure and which do not leak.

SUMMARY OF THE PRESENT INVENTION

In a specific embodiment of the present invention, a machine inflates and seals pillows in packaging while continuously and uninterruptedly advancing a web of film through an inflating station and a sealing station. The inflating station sequentially inflates pillows at preformed patterns in the web of film by introducing pressurized air through a narrow width inlet port of a preformed pattern. The sealing station seals each inlet port by applying a heated sealing element directly to and in sliding contact with the web of film while the air in an inflated pillow is under pressure as the inlet port moves across the heated sealing element.

The web of film has an uninflated pillow pattern and an uninflated inflation channel preformed in the film. The uninflated pillow patterns comprise multiple, spaced apart, pillow patterns aligned along one side of an inflation channel. The inflation channel extends longitudinally and continuously along the entire length of the film. Each uninflated pillow pattern has a narrow width inlet port extending generally transversely to the longitudinally extending inflation channel and connecting the uninflated pillow pattern to the uninflated inflation channel so that, when pressurized air is introduced into the inflation channel, the pressurized air can be transmitted through the inlet port to inflate the pillow pattern. In some cases the preformed pattern is also formed with outlet ports connected to the inflation channel in such a way that air entering the inflation channel can move into a pillow through an inlet port and can also exit out of the inflation channel through the outlet port. The outlet port is generally shaped smaller than the inlet port.

By allowing the air above a desired pressure to escape through an outlet port or ports, the pressure in the inflation channel is maintained at a desired level for inflating the pillows without creating over-pressurization.

The air escaping through the outlet port is also sensed to detect where the pillows are in the machine. These detected outlet port positions are then used as signals for an associated electronic unit to count the number of pillows inflated in a particular run through the machine. This also facilitates being able to stop the movement of the film through the machine after one production run of a selected number of inflated pillows at a position which is the right position to start a subsequent production run of a selected number of inflated pillows.

In a specific embodiment of the present invention, the web of film with the preformed patterns is stored on a storage roller of the machine and is advanced through the machine by a first set of nip rollers and a second set of nip rollers at a respective first film transport station and a second film transport station.

Pressurized air is introduced into the inflation channel of the web of film at an inflating station as the web of film is transported through the first film transport station. The pressurized air inflates at least one of the pillow patterns prior to the time the web of film is continuously transported through a sealing station.

Pressure is maintained in the inflated pillow pattern within a calibrated pressure range during the time that the web of film is continuously transported through the sealing station.

At the sealing station the inlet port of an inflated pillow is sealed by applying a heated sealing element directly to and in sliding contact with the web of film. The heated sealing element slides across the inlet port while the air in the inflated pillow is under pressure and as the web of film is continuously and uninterruptedly advanced throughout all components of the machine.

The heated sealing element has a relatively small longitudinal dimension in the direction of movement of the web of film. In a specific embodiment the length of the heated sealing element is about the same as the width of the inlet port of a pillow pattern. This small size of the heated sealing element helps minimize the amount of sealing heat applied to the web of film.

The sealing station includes a sealing roller disposed alongside the heated sealing element so as to permit the web of film to be advanced between the sealing roller and the heated sealing element. Adjustable biasing means provide for adjustment of the force with which the heated sealing element and the sealing roller are pressed toward engagement with one another.

The sealing roller is positioned with respect to the first and second pairs of nip rollers so as to cause the web of film to wrap around a part of the peripheral surface of the sealing roller both in a circumferential direction and also in a lateral direction. This helps create a dead and flat zone right at and adjacent to the line of sealing across the inlet port. This in turn facilitates making a secure seal without leaking while the pillow is inflated under pressure.

The axes of rotation of at least the second pair of nip rollers are preferably canted at a slight angle with respect to the axis of rotation of the sealing roller.

The second pair of nip rollers are preferably rotated at a speed slightly faster than the speed of rotation of the first pair of nip rollers so as to maintain tension in the web of film between the second and first pair of nip rollers.

In one specific embodiment of the present invention the heated sealing element is a fabric covered Nichrome wire disposed at the end of a bar element which is biased toward engagement with a sealing roller. The fabric covering of the Nichrome wire has a Teflon coating on its outer surface for facilitating sliding of the heated sealing element on the engaged surface of the film as the web of film is advanced through the machine.

The bar on which the heated sealing element is mounted is a composite bar. The very tip of the bar is a ceramic having good insulating qualities, and the remainder of the bar is a different material selected to provide enhanced mechanical durability.

The seal is formed complete and secure during a short path of travel through the sealing station.

The seal is complete and secure at the time the web of film moves out of contact with the wheel at the sealing station and without the need for additional pressing together of the film after the sealing station and without the need for additional cooling of the film across the sealed inlet port after the sealed inlet port moves out of contact with the sealing station.

In a second specific embodiment of the present invention the sealing wheel is pressure biased toward engagement with the heated sealing element.

In both the first and second specific embodiments the heated sealing element and the sealing wheel are spaced apart from one another when the machine is not transporting the web of film through the machine in a production run. This enables the heated sealing element to be maintained at a desired temperature level while preventing contact with and possible burning of the unmoving film at the sealing station.

In one specific embodiment of the invention the fabric covering for the Nichrome wire is held in a fixed position at the end of the bar element and is replaced as needed.

In another specific embodiment of the invention the heating station includes a cartridge unit which can be quickly and easily interchanged with another cartridge unit. The cartridge unit includes an elongated strip of the fabric covering. The strip is mounted on two rotatable reels. The fabric always covers the Nichrome wire, as in the first specific embodiment, and the fabric has a Teflon coating on the side which engages the film in sliding contact, as in the first specific embodiment. The elongated strip of fabric covering is wound between the two reels so as to be moved across the length of the Nichrome wire at a speed which is much slower than the speed of movement of the film through the machine but which is fast enough to ensure that the covering strip of fabric is always effective to function properly without any burn through of the fabric or damage to the film from the heated Nichrome wire. The cartridge unit permits the Nichrome wire of the heated sealing element to be easily disconnected from its power supply. The cartridge units are constructed to be readily interchanged as units, rather than having to replace individual components of the cartridge unit.

Methods and apparatus which incorporate the features noted above and which are effective to function as described above comprise further, specific objects of this invention.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWING VIEWS

FIG. 1 is an isometric view of a machine, constructed in accordance with one embodiment of the present invention, for inflating and sealing pillows in packaging. FIG. 1 is a general view which illustrates how a web of film is transported through the machine. FIG. 1 shows how the web of film has a preformed pattern of spaced-apart, inflatable pillows aligned along one side of a longitudinally extending inflation channel. FIG. 1 illustrates how rollers (at a first transport station, at a sealing station, and at a second transport station) are positioned to engage the underside (as viewed in FIG. 1) of the web of film.

FIG. 2 is another isometric view of the machine shown in FIG. 1, but in FIG. 2 the lower part of the figure has been revised to (in effect) see through the web of film in order to show details of certain structure of the machine. FIG. 2 shows the inflation tube of the inflating station, the nip rollers of the first transport station, the heated sealing element and the associated sealing roller at the sealing station, and the nip rollers at the second transport station.

FIG. 3 is an isometric view of the machine of FIGS. 1 and 2, but without the web of film material. FIG. 3 shows the main structural and operative features of the machine itself.

FIG. 4 is an isometric, enlarged view showing details of the features of the first film transport station, the inflation station structure, the sealing station structure, the slitting station structure, and the second film transport station structure.

FIG. 5 is an isometric, enlarged view like FIG. 4 but shows details of just the mechanism for driving the various rollers of the machine. FIG. 5 does not show the inflation station structure, the heated sealing element at the sealing station, or the slitter structure for opening up the inflation tube of the web of film after the sealing station.

FIG. 6 is an isometric view showing details of the structure of the sealing station. FIG. 6 shows the heated sealing element pressed toward engagement with the sealing wheel in the positions occupied by those two components during a production run of the inflated pillow packaging through the machine.

FIG. 7 is a top plan view, taken along the line and in the direction indicated by the arrows 7—7 in FIG. 6, but showing the heated sealing element retracted away from the sealing wheel in the positions occupied by those two components when no film is being transported through the machine.

FIG. 8 is a top plan view of a specific embodiment of a web of film constructed in accordance with the present invention and having a specific pattern of inflatable pillows, inlet ports for permitting inflation of the pillows, and escape ports for preventing over pressurization of the pillows and for also permitting more accurate position sensing of the pillows as the web of film moves through the machine.

FIGS. 9A–9G are a series of the isometric views showing details of the structure, components and sequence of assembly of certain components of the heated sealing element at the sealing station.

FIG. 10 is an isometric view of a machine constructed in accordance with a second embodiment of the present invention. The embodiment of the machine shown in FIG. 10 includes a cartridge unit which is mounted on a separate sub-plate or sub-frame and which permits all of the components of the cartridge unit to be quickly and easily removed and replaced by another, replacement cartridge unit. The cartridge unit provides the heated sealing element components for the sealing station. FIG. 10 shows the sealing wheel of the sealing station positioned to engage the web of film in sliding contact with the heated sealing element during a production run of packaging.

FIG. 11 is an isometric view like FIG. 10 but showing the sealing wheel moved to a retracted position which permits the web of film to move out of contact with the heated sealing element when the machine is stopped between production runs and the film is not being transported through the machine.

FIG. 12 is an enlarged, isometric view of the replaceable cartridge unit itself. FIG. 12 shows the strip of covering fabric in stored positions on the reels of the cartridge unit prior to installation of the cartridge unit in the machine. When installed in the machine, a portion of the strip of covering fabric is positioned over the wire of the heating element (as illustrated in FIGS. 10 and 11).

FIG. 13 is an enlarged, isometric view of the sealing wheel and the related actuator mechanism for positioning the sealing wheel at the sealing station.

FIG. 14 is an enlarged, side elevation view of the sealing station structure with the structure in the operative position shown in FIG. 10; and, FIG. 15 is an enlarged, side elevation view of the sealing station structure with the structure in the non-operating position shown in FIG. 11.

DETAILED DESCRIPTION OF THE PREFERRED EMBODIMENTS

FIGS. 1, 2 and 3 are isometric view of a machine, constructed in accordance with one embodiment of the present invention, for inflating and sealing pillows in packaging.

The machine is indicated by the general reference numeral 11 in each of FIGS. 1, 2 and 3.

The machine 11, as most easily viewed in FIG. 3, comprises a main plate 13 on which various structural and operational features are mounted.

A support tube 15 is mounted near the upper edge of the main plate 13 for supporting a roll 17 of a web of film 19.

Guide tubes 21 and 23 are mounted on the plate 13 below the tube 15. The tubes 21 and 23 serve to guide the web of film 19 from the roll 17 to the operating mechanism 25 of the machine 11. The operating mechanism 25 is described in more detail below.

The mechanism 25 is illustrated in detail in FIG. 4 and comprises a first film transport station 27, a second film transport station 29, an inflating station 31, a sealing station 33, and a slitting station 35.

The first film transport station 27 includes a first pair of nip rollers 37 and 39 for gripping the web of film 19 (see FIG. 1) and for pulling the web of film 19 from the roll 17 and under and over the guide tubes 21 and 23 and through the first film transport station 27 when the nip rollers are rotated by associated drive gears 41, 43 and a drive belt 45. The nip rollers 37 and 39 are rotated in the directions indicated by the direction arrows on the drive gears 41 and 43 shown in FIG. 4.

The drive belt 45 is driven by a drive gear 47 which is in turn driven by a motor 48 (see FIG. 5).

The second film transport station 29 comprises a second pair of nip rollers 49 and 51 which grip the web of film 19 to continuously advance the web of film 19 from the first transport station 27 to and through the inflating station 31 and to and through the sealing station 33 and then to and through the second film transport station 29.

The nip rollers 49 and 51 are driven by drive gears 53 and 55 and in the rotational directions indicated by the directional arrows on the drive gears 53 and 55 in FIG. 4.

Drive shafts 40 and 44 transmit the drive from the drive gears 41 and 43 to the nip rollers 37 and 39.

Drive shafts 50 and 52 transmit the drive from the drive gears 53 and 55 to the nip rollers 49 and 51.

With continued reference to FIG. 4, the drive belt 45 passes about an idler gear 57. The drive gears 41, 43, 47, 53, 55 and idler gear 57 are all mounted for rotation on and are supported by the main plate 13.

The inflating station 31 includes an inflation tube 59 and a generally spherically shaped and partially Teflon coated ball 61 located at the upper end (as viewed in FIG. 4) of the tube 59. The ball 61 has a plurality of openings 63 for injecting pressurized air into an inflation channel in the web of film 19.

As illustrated in FIGS. 1, 2 and 8, the web of film 19 as stored on the roll 17 shown in FIG. 1 has a pattern of pillows 65, a longitudinally extending inflation channel 67, inlet ports 69, and outlet ports 71 preformed in the web of film. The pillows 65, channel 67, ports 69 and ports 71 are uninflated in the web of film as stored on the roll 17.

The uninflated pillow patterns 65 are longitudinally spaced apart from one another and are aligned (in the embodiment of the web of film 19 illustrated in the drawings) along one side of the inflation channel 67.

The inflation channel 67 extends longitudinally and continuously along the entire length of the web of film 19.

The inflation channel 67 is dimensioned to provide a close, sliding fit over the Teflon coated ball 61.

Each pillow 65 is connected to the inflation channel 67 by an inlet port 69. The inlet port 69 extends generally transversely to the longitudinally extending inflation channel 67 and has a narrow interior width which is positioned at the sealing station 33 (in a manner to be described more fully below) to facilitate quick and secure sealing of pressurized air within an inflated pillow 65 in a small path of travel and in a short time of continuous, uninterrupted travel through the sealing station 33.

The outlet ports 71 are shaped to be somewhat smaller than the inlet ports 69. These outlet ports 71 are located on the side of the channel 67 opposite the inlet ports 69 and are generally aligned with the inlet ports 69.

As will be described in greater detail below, the outlet ports 71 allow air to escape in a way to maintain pressure in the channel 67 and in the inflated pillows at a calibrated, desired level without creating over-pressurization in the pillows.

In addition, the air that exits from an outlet port 71 can be sensed by a pressure transducer 73 (see FIG. 8) to allow for accurate position sensing of the pillows as the pillows move through the machine 11.

The air escaping through the outlet ports is sensed to detect where the pillows are in the machine. These detected outlet port positions are then used as signals for an associated electronic unit to count the number of pillows inflated in a particular run through the machine. This also facilitates being able to stop the movement of the film through the machine, after one production run of a selected number of inflated pillows, at a position which is the right position to start a subsequent production run of a selected number of inflated pillows.

The upper end of the inflation tube 59 is formed with a small curvature so as to better follow the path of the film 19 as the film is advanced through the first transport station 27 and the sealing station 33.

Details of the construction and mode of operation of the sealing station 33 are illustrated and will be described with reference to FIGS. 4, 6 and 7.

The sealing station 33 comprises a sealing roller 75 mounted on a shaft 77 which is in turn mounted for rotation in a bearing assembly attached to the main plate 13.

The sealing station 33 also comprises a heated sealing element located at the outer end (the right hand end as viewed in FIG. 7) of a bar 81. The very tip 80 of the bar 81 is a ceramic of aluminum silicate to provide an insulation function, and the remainder of the bar 81 is a different material selected for mechanical durability.

The bar 81 is mounted for sliding motion within a support 83.

A spring 85 and an adjustment screw 87 provide a selectable bias force for biasing the bar 81 toward the opposed periphery of the roller 75 so that the film 19 (in the longitudinally extending strip which crosses the inlet ports 69) is pressed in rolling contact with the outer periphery roller 75 and in sliding contact with the end surface of the bar 81 as the first and second film transport stations continuously advance the web of film 19 through the sealing station 33.

An actuator 89 is included in the sealing station 33 for retracting the bar 81 against the bias of spring 85 and away from engagement with the roller 75 when the film 19 is not being advanced through the machine 11. This facilitates keeping the heating element energized at the proper heating level and out of contact with the film 19 during time intervals when the machine 11 is not being used to produce inflated pillow packaging.

Details of the structure, components and sequence of assembly of components of the heated sealing element are shown in the exploded views of FIGS. 9A–9F.

The heating element disposed at the end of the bar 81, in a specific embodiment of the present invention, comprises at least one Nichrome wire 70 which runs vertically (as viewed in FIGS. 9A–9G) along the right hand end of the bar 81.

The Nichrome wire 70 at this location has a length about the same as the throat width of an outlet port 69 in the film 19, and the Nichrome wire 70 is covered by a fabric 72 having a Teflon coating on the surface which contacts the film 19. The fabric covering 72 helps to form the wire 70 to a preferred shape for engagement with the film 19, and the Teflon coating facilitates sliding movement of the film 19 with respect to the heated sealing element.

The heated sealing element comprises at least one Nichrome wire 70, but (as illustrated in FIGS. 9A–9F) the present invention also encompasses using a plurality of parallel extending and laterally spaced apart Nichrome wires 70 for providing multiple seal lines across inlet ports 69 of the pillows 65.

As best illustrated in FIGS. 6 and 7, wires 91 and 93 conduct electricity to the Nichrome wire for heating the Nichrome wire.

The slitting station 35 (see FIG. 4) includes a blade 95 attached to the inflation tube 59 and positioned to slit the inflation channel 67 in the film 19 after the outlet port 69 of a pillow 65 has been sealed at the sealing station 33. This enables strips of inflated packaging to be removed from the machine 11.

It is an important feature and benefit of the present invention that the components of the mechanism 25 and the coaction between those components enable a seal to be formed complete and secure in a short path of travel of the film through the sealing station 33 and in a short period of time and without the need for additional pressing together of the web of film after the sealing station and without the need for additional cooling of the seal across the inlet port after the sealed inlet port moves out of contact with the sealing station. The sealing of the inlet port at the sealing station is performed by applying the heated sealing element directly to and in sliding contact with the web of film and across the inlet port while the air and the inflated pillow is under pressure and as the web of film is continuously and uninterruptedly advanced through the mechanism 25 shown in FIG. 4.

A number of features of the present invention contribute to obtaining this efficient and beneficial sealing result.

As described above, the outermost tip of the bar 81 is a ceramic material which functions as an insulator to help confine the heat of the heating element to substantially just the linear area of contact of the fabric covered Nichrome wire with the film 19.

The roller 75 is laterally offset outwardly (as viewed in FIGS. 1–5) and is positioned with respect to the pairs of nip rollers 37–39 and 49–51 so as to cause a bump in the film 19 at the sealing station 33. This helps to create a dead zone adjacent the inlet port 69 to be sealed by causing the web of film 19 to wrap around a part of the peripheral surface of the sealing roller 75 both in a circumferential direction and also in a lateral direction.

Driving the second pair of nip rollers 49–51 at a slightly higher speed than the first pair of nip rollers 37–39 helps to insure that the film 19 is maintained flat and in substantially pressure sealing engagement with the periphery of the sealing roller 75.

As best shown in FIG. 5, the axes of rotation of at least the second set of nip rollers 49–51 are preferably canted at a slight upward (as viewed in FIG. 5) angle with respect to the axes of rotation of the main drive gear 47 and the sealing roller 75.

In a specific embodiment of the present invention the axes of rotation of the first set of nip rollers 37–39 are also canted at this same slightly upwardly inclined angle.

The inclusion and positioning of the outlet ports 71 (see FIG. 8) and the smaller size of these outlet ports contribute to allowing air to escape through the outlet ports in an amount to maintain sufficient pressure in the channel 67 without permitting over-pressurization in that channel 67 or in the pillows 65.

The present invention permits sealing the inlet port at a sealing station by applying a heated sealing element directly to and in sliding contact with the web of film and across the inlet port while the air and the inflated pillow is under pressure and as the web of film is continuously and uninterruptedly advanced through each of the first transport station, inflating station, sealing station, second transport station and slitting station.

In FIGS. 1, 2 and 8 of the drawings the pillows 65 are shown in a generally rectangular-shaped pattern. It should be noted, however, that the pillows 65 can be any preformed pattern configuration. The patterns of the pillows 65 can, for example, include preformed seal line elements within the interior of the pillows which permit the pillows to be folded along one or more of the preformed interior seal lines. This in turn permits one pillow to cushion an object in more than one direction when placed within a shipping container.

Score lines (not illustrated in the drawings, but similar to score lines shown in webs of plastic film described in numerous ones of the prior U.S. patents incorporated by reference in this application) permit ready detachment of single ones or groups of inflated pillows from the film 19 after the pillows are inflated and sealed.

A number of different film compositions (also as noted in U.S. patents incorporated by reference in this application) can be used as the composition material for the web of film 19.

The machines that are used to preform the patterns on the web of film 19 include conventional presses which impress multiple pillow patterns (and the related ports and inflation channel) on a strip of film 19 on each pressing operation. The pattern is formed while there is no inflation pressure anywhere in the web 19.

The preformed pattern can also be formed by a roller arrangement in which at least one roller is heated and configured to form the desired patterns.

Pattern forming machines of these kinds are also disclosed in several of the U.S. patents incorporated by reference in this application.

Such machines for forming preformed patterns in the film 19 can be associated with the machine 11 shown in FIG. 1 to replace the storage roll 17 so that the preformed patterns can be preformed continuously at the site where the machine 11 is installed. However, in most cases it is more practical to use a storage roll 17 with preformed patterns than it is to preform the patterns at the job site where the machine 11 is to be used.

A second embodiment of a machine constructed in accordance with the present invention is illustrated in FIGS. 10–15 of the drawings. This second embodiment is indicated by the general reference numeral 101.

The components and parts of the machine 101 which correspond to the machine 11 shown in FIGS. 1–9 are indicated by corresponding reference numerals.

The machine 101 includes a cartridge unit 103 (see FIG. 12) which is mounted on a separate sub-plate or sub-frame 105. The sub-frame 105 is mounted on the main plate or main frame 13. This cartridge unit technique permits the components of the entire cartridge unit to be quickly and easily interchanged (as a unit) with another replacement cartridge unit. Individual components of the cartridge unit do not have to be removed and replaced.

In the machine 101 shown in FIGS. 10–15, the construction and mounting of the cartridge unit 103 permits the entire cartridge unit to be pulled out of a box and plugged in as a unit at the production site. This cartridge unit permits all of the components of the cartridge unit to be replaced as a unit. It is never necessary, for example, to replace the Nichrome wires as individual elements in the field. Instead, the entire cartridge unit is just pulled out and replaced as a unit with a replacement cartridge unit.

The structure, components and mode of operation of the first film transport station 27, the second film transport station 29, the inflation station 31, and the slitting station 35 are the same as the corresponding mechanism, components and mode of operation described above with reference to the machine 11, and will not be reviewed in more specific detail at this point.

The specific structure of the sealing station 33 of the machine 101 is different from the machine 11 and will be described in more detail below. However, the method of making seals across the inlet ports 69 in the machine 101 is the same as the method of machine 11, as will be understood from the description to follow.

One difference between the sealing station structure of the machine 11 and the sealing station structure of the machine 101 is in the way that the heated sealing element and the sealing wheel are moved apart from one another during those times when the machine is stopped between production runs of inflated pillows.

In the machine 11 (and as illustrated in FIG. 7) the heated sealing element which is mounted on the end of the bar 81 is retracted away from the sealing wheel 75. In the machine 11 the shaft 77 of the heated sealing wheel 75 is held in a fixed position with respect to the frame 13 in all modes of operation of the machine 11.

In the machine 101 the heated sealing element is held in a fixed position with respect to the frame 13. The rotational shaft 77 of the sealing wheel 75 is mounted for rotation in a movable support bracket 78 so that the sealing wheel 75 is movable toward and away from the heated sealing element.

As best illustrated in FIG. 13, the support bracket 78 is mounted on a rod 82 of an actuator 84. The actuator 84 is mounted on a support plate 86, and the support plate 88 is mounted on the main plate 13 of the machine 101.

The actuator 84 extends and retracts the rod 82 to move the sealing wheel 75 between the retracted position of the rod 82 shown in FIGS. 11 and 15 and the extended position shown in FIGS. 10 and 14.

In the retracted position illustrated in FIGS. 11 and 15 the sealing wheel 75 is positioned to let the film 19 remain out of contact with the heated sealing element when the machine 101 is not operated in a production run.

In the extended position shown in FIGS. 10 and 14 the sealing wheel 75 is positioned to engage the film 19 and to press that film 19 in sliding contact with the heated sealing element as the film 19 is continuously and uninterruptedly advanced through the machine during a production run of inflated pillows.

The force with which the film 19 is engaged in sliding contact with the heated sealing element is determined by selecting the pressure level within the actuator 84.

As best illustrated in FIGS. 12, 10, and 14, the cartridge unit 103 comprises a guide block 107 mounted in a fixed position on the sub-plate 105, two reels 109 and 111, each mounted for rotation on the sub-plate 105, and a guide post 113 mounted on the sub-plate 105.

The reels 109 and 111 are storage and take-up reels for a strip of covering fabric 72. The fabric 72 has a Teflon coating on the side engaged in sliding contact with the film 19.

The strip of covering fabric 72 is trained around a guide post 113 and into the guide slots 115 and 117 which are recessed within the outer and forward surfaces of the flanges 119 and 121 of the guide block 107.

The way that the strip of covering fabric 72 is conveyed from the storage roller 109, around the guide post 113, through the guide slot 115, over the Nichrome wires 70, through the guide slot 117 and onto the reel 111 is best illustrated in FIGS. 10, 11, 14 and 15.

In a specific embodiment of the machine 101 the lower reel 111 is driven, through reduction gearing, and by an electric motor (not shown), to pull the strip of covering fabric 72 across the Nichrome wires 70 at a relatively slow speed (a speed considerably slower than a speed at which the web of film 19 is transported through the machine 101 during a production run), but at a speed fast enough to insure that no part of the covering fabric 72 is ever in contact with the Nichrome wires 70 long enough to permit any burn through of the fabric by the Nichrome wires 70. The reel storage of the covering fabric 72 and the slow movement of the fabric with respect to the Nichrome wires 70 during operation of the machine 101 thus insure that the area of the fabric engageable with the Nichrome wires is, in effect, renewed soon enough to prevent any burn through.

As best illustrated in FIGS. 12 and 15, the outer tips of the flanges 119 and 120 extend slightly beyond the outer surfaces of the Nichrome wires 70. This insures that the covering fabric 72 is engaged with the Nichrome wires 70 only when the sealing wheel 75 is moved to the position shown in FIGS. 10 and 14 during a production run of the machine 101.

The strip of covering fabric 72 is held out of contact with the Nichrome wires 70 when the machine 101 is not being operated in a production run of packaging.

While not illustrated in FIGS. 10–15, the Nichrome wires 70 are energized by detachable leads 91 and 93 (as illustrated for the machine 11 in FIGS. 9A–9G).

The sealing roller 75 of the machine 101 is laterally offset outwardly in the same way as the sealing roller 75 of the machine 11 so as to cause a bump in the film 19 at the sealing station 33. This helps to create a dead zone adjacent the inlet port 69 to be sealed by causing the web of film 19 to wrap around a part of the peripheral surface of the sealing roller 75 both in a circumferential direction and also in a lateral direction (as described above with reference to the machine 11).

The machine 101 permits sealing the inlet port at a sealing station by applying a heated sealing element directly to and in sliding contact with the web of film and across the inlet port while the air in an inflated pillow is under pressure and as the web of film is continuously and uninterruptedly advanced through each of the first transport station, inflating station, sealing station, second transport station and slitting station.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

What is claimed is:

1. A machine for inflating and sealing a preconfigured film material having inflatable chambers in communication with an inflation channel to make air-filled packing cushions, comprising: a support wall, a spindle extending from the support wall for rotatively supporting a roll of the film material on one side of the wall, a feed mechanism on the same side of the wall as the spindle for drawing the film material from the roll and advancing it along a substantially vertical path past the wall, an air injector for injecting air into and thereby inflating the chambers as the material advances along the path, a heating element for sealing the inflated chambers in the advancing material, and a knife blade positioned near the wall for slitting the film material along the inflation channel as the material advances along the path.

2. The machine of claim 1 wherein the feed mechanism includes a plurality of rollers which engage only an edge portion of the film material near the wall.

3. The machine of claim 1 wherein the air injector and the heating element are spaced vertically from the roll of film material.

4. The machine of claim 1 including a stationary guide which extends laterally from the support wall for directing the film material along the path.

5. The machine of claim 4 wherein the guide has a cylindrical surface about which the film material is trained as it advances between the roll and the air injector.

6. The machine of claim 1 including means for discharging the cushions from the machine in a downward direction after the chambers have been inflated and sealed.

7. The machine of claim 1 wherein the knife blade is mounted on the injector.

8. A machine for inflating and sealing a preconfigured film material with inflatable chambers in communication with an inflation channel to make air-filled packing cushions, comprising: an upstanding support wall, a spindle extending horizontally from one side of the support wall for rotatively supporting a roll of the film material in a position generally perpendicular to the wall, a feed mechanism on the same side of the wall as the spindle for drawing the film material from the roll and advancing it along a substantially vertical path beside the wall, an elongated inflation tube for injecting air into the inflation channel to inflate the chambers as the material advances along the path, a heating element for sealing the inflated chambers in the advancing material, and a knife blade mounted on the inflation tube for slitting the film material along the inflation channel as the material advances along the path past the inflation tube.

9. A machine for inflating and sealing a preconfigured film material having inflatable chambers in communication with an inflation channel to make air-filled packing cushions, comprising: a support wall, a spindle extending from the support wall for rotatively supporting a roll of the film material on one side of the wall, a feed roller mounted on a shaft near the wall for engaging an edge portion of the film material and advancing the material along a substantially vertical path past the wall, drive means connected to the shaft, an air injector for injecting air into and thereby inflating the chambers as the material advances along the path, a knife blade positioned near the wall for slitting the film material along the inflation channel as the material advances along the path, and a heating element for sealing the inflated chambers in the advancing material.

10. The machine of claim 9 wherein the heating element is mounted on the outer side of the wall in the path of the film material.

11. The machine of claim 9 wherein the air injector includes an inflation tube which is spaced from and generally parallel to the outer side of the wall.

12. A machine for inflating and sealing a preconfigured film material with inflatable chambers in communication with an inflation channel to make air-filled packing cushions, comprising: an upstanding support wall having inner and outer sides, a spindle extending horizontally from the support wall for rotatively supporting a roll of the film material perpendicular to the wall, a feed roller mounted on a shaft which passes through the wall for engaging an edge portion of the film material and advancing the material along a substantially vertical path on the outer side of the wall, drive means connected to the shaft on the inner side of the wall, an air injector which includes an inflation tube which is spaced from and generally parallel to the outer side of the wall for injecting air into the inflation channel to inflate the chambers as the material advances along the path, a knife blade mounted on the inflation tube for slitting the film material along the inflation channel after the air has been injected into the channel, and a heating element for sealing the inflated chambers in the advancing material.

13. A machine for inflating and sealing a preconfigured film material having inflatable chambers in communication with an inflation channel extending along an edge portion of the material to make air-filled packing cushions, comprising: a support wall, a spindle mounted in cantilevered fashion and extending from the support wall for rotatively supporting a roll of the film material, a feed mechanism on the same side of the wall as the spindle for drawing the film material from the roll and advancing it along a substantially vertical path past the wall, an air injector positioned to be received in the inflation channel and inject air to inflate the chambers as the material advances along the path, a knife blade positioned near the wall for slitting the film material along the inflation channel as the material advances along the path, and a heating element for sealing the inflated chambers in the advancing material.

14. The machine of claim 13 wherein the feed mechanism includes first and second pairs of rollers which are disposed along the path and engage only the edge portion of the film material near the support wall, and the heating element is disposed along the path between the first and second pairs of rollers.

15. The machine of claim 13 wherein the path extends along and generally parallel to the support wall.

16. The machine of claim 13 wherein the wherein the edge portion of the film material is generally perpendicular to the support wall as the edge portion advances along the path and through the feed mechanism.

17. A machine for inflating and sealing a preconfigured film material with inflatable chambers in communication with an inflation channel extending along an edge portion of the material to make air-filled packing cushions, comprising: an upstanding support wall, a spindle mounted in cantilevered fashion and extending from the support wall in a direction generally perpendicular to the wall for rotatively supporting a roll of the film material, first and second pairs of rollers which are disposed on the same side of the wall as the spindle and engage only the edge portion of the film for drawing the film material from the roll and advancing it along a substantially vertical path beside the wall, with the rollers in the second pair rotating faster than the rollers in the first pair, an air injector for injecting air into the chambers as the material advances along the path, and a heating element disposed between the first and second pairs of rollers for sealing the inflated chambers in the advancing material.

18. A machine for inflating and sealing a preconfigured film material having inflatable chambers in communication with an inflation channel extending along an edge portion of the material to make air-filled packing cushions, comprising: an upstanding support wall, a spindle mounted in cantilevered fashion and extending from the support wall in a direction generally perpendicular to the wall for rotatively supporting a roll of the film material, a feed mechanism on the same side of the wall as the spindle for drawing the film material from the roll and advancing it along a substantially vertical path beside the wall, an air injector positioned to be received in the inflation channel and inject air into the inflation channel to inflate the chambers as the material advances along the path, a heating element for sealing the inflated chambers in the advancing material, and a strip of fabric which moves between the heating element the film material.

19. A machine for inflating and sealing a preconfigured film material having inflatable chambers in communication with an inflation channel extending along an edge portion of the material to make air-filled packing cushion, comprising: an upstanding support wall, a spindle mounted in cantilevered fashion and extending from the support wall in a direction generally perpendicular to the wall for rotatively supporting a roll of the film material, a feed mechanism on the same side of the wall as the spindle for drawing the film material from the roll and advancing it along a substantially vertical path beside the wall, an air injector positioned to be received in the inflation channel and inject air into the inflation channel to inflate the chambers as the material advances along the path, a heating element for sealing the inflated chambers in the advancing material, and a sealing roller for pressing the film material against the heating element.

20. A machine for inflating and sealing a preconfigured film material having inflatable chambers in communication with an inflation channel to make air-filled packing cushions, comprising: a wall, a spindle on one side of the wall for rotatively supporting a roll of the film material, a feed mechanism on the same side of the wall as the spindle for drawing the film material from the roll and advancing it along a substantially vertical path past the wall, an air injector for inflating the chambers as the material advances along the path, a knife blade positioned near the wall for slitting the film material along the inflation channel as the material advances along the path, and means on the same side of the wall as the spindle for sealing the chambers when they are inflated.

21. The machine of claim 20 wherein the injector has an axially elongated body which extends in a direction generally parallel to the outer face of the side wall and is received in the inflation channel as the material advances along the path.

22. A machine for inflating and sealing a preconfigured film material having inflatable chambers in communication with an inflation channel to make air-filled packing cushions, comprising: a wall, a spindle extending from the wall for rotatively supporting a roll of the film material on one side of the wall, a feed mechanism on the same side of the wall as the spindle for drawing the film material from the roll and advancing it along a substantially vertical path beside the wall, an air injector for inflating the chambers as the material advances along the path, an axially elongated body associated with the air injector which extends in a direction generally parallel to the wall and is received in the inflation channel as the material advances along the path, means on the same side of the wall as the spindle for sealing the chambers when they are inflated, and a knife blade mounted on the elongated body for slitting the film material along the inflation channel to allow the material to advance past the injector.

23. A machine for inflating and sealing a preconfigured film material with inflatable chambers in communication with an inflation channel to make air-filled packing cushions, comprising: an upstanding support wall having inner and outer sides, a spindle extending horizontally from the support wall for rotatively supporting a roll of the film material perpendicular to the wall, a feed roller mounted on a shaft which passes through the wall for engaging an edge portion of the film material and advancing the material along a substantially vertical path on the outer side of the wall, drive means connected to the shaft on the inner side of the wall, an air injector which passes through the wall and has an elongated body which is spaced from and generally parallel to the outer side of the wall for injecting air into the chambers as the material advances along the path, a knife blade mounted on the injector for slitting the film material along the inflation channel, and a heating element for sealing the chambers as the material advances.

24. The machine of claim 23 wherein the elongated body of the air injector is a tubular member through which the air is injected.

25. The machine of claim 24 wherein the air injector further includes a spherically shaped ball at one end of the tubular member, with a plurality of openings in the ball through which air is injected.

26. Apparatus for inflating and sealing a preconfigured film material having inflatable chambers in communication with a relatively narrow channel to make air-filled packing cushions, the apparatus comprising:
a support wall;
a spindle extending from the support wall for rotatively supporting a roll of film material on one side of the support wall;
a pair of film drive rollers on the same side of the wall as the spindle for drawing the film material from the roll and advancing it in a substantially vertical path along the wall through inflation, sealing, and slitting mechanisms;
wherein the inflation mechanism comprises an air injector for injecting air into the chambers as the material advances along the path;
wherein the sealing mechanism comprises the electrically energized heating element that generates heat to be delivered to seal the inflatable chambers and trap the inflation gas within the inflatable chambers as the film is advanced along the path; and
wherein the slitting mechanism is positioned near the wall for slitting the film material along the relatively narrow channel as the material advances along the path.

27. The apparatus of claim 26 further comprising an elongate member adapted for insertion into the relatively narrow longitudinally extending channel.

28. The apparatus of claim 27 wherein the air injector comprises at least one opening on the elongate member for injecting air into the relatively narrow longitudinally extending channel.

29. Apparatus for inflating and sealing a preconfigured film material with inflatable chambers in communication with relatively narrow channel to make air-filled packing cushions, the apparatus comprising:
an upstanding support wall;
a spindle extending horizontally from one side of the support wall for rotatively supporting a roll of film material in a position generally perpendicular to the wall;
a feed mechanism on the same side of the wall as the spindle for drawing the film material from the roll and advancing it in a substantially vertical path along the wall through inflation, sealing, and slitting mechanisms;
an elongate member adapted for insertion into the relatively narrow channel as the film is advanced along the substantially vertical path;
wherein the inflation mechanism comprises an air injector for injecting air into the inflatable chambers to inflate the chambers as the material advances along the path;
wherein the sealing mechanism comprises the electrically energized heating element that generates heat to be delivered to seal the inflatable chambers and trap the inflation gas within the inflatable chambers as the film is advanced along the path; and
wherein the slitting mechanism is mounted on the elongate member for slitting the film material along the relatively narrow channel as the material advances along the path past the elongate member.

30. The apparatus of claim 29 wherein the air injector comprises at least one opening on the elongate member for injecting air into the relatively narrow longitudinally extending channel.

* * * * *

UNITED STATES PATENT AND TRADEMARK OFFICE
CERTIFICATE OF CORRECTION

| | | |
|---|---|---|
| PATENT NO. | : 7,059,097 B2 | Page 1 of 1 |
| APPLICATION NO. | : 10/732437 | |
| DATED | : June 13, 2006 | |
| INVENTOR(S) | : Andrew Perkins et al. | |

It is certified that error appears in the above-identified patent and that said Letters Patent is hereby corrected as shown below:

Please insert
Item [56]
In the References Cited, US Patent Documents, Page 1:
    Please insert US 3,889,743; 06/17/1975; Presnick In Claim 29, Column 16, Line 47:
    Please replace "comprises the electrically" with --comprises an electrically--

Signed and Sealed this

Twenty-sixth Day of December, 2006

JON W. DUDAS
*Director of the United States Patent and Trademark Office*